United States Patent [19]

Matsuki et al.

[11] Patent Number: 5,461,983
[45] Date of Patent: Oct. 31, 1995

[54] GAS GENERATOR

[75] Inventors: Masuo Matsuki; Haruyuki Ikesue, both of Kanagawa, Japan

[73] Assignee: NSK Ltd., Tokyo, Japan

[21] Appl. No.: 272,536

[22] Filed: Jul. 11, 1994

[30] Foreign Application Priority Data

Jul. 14, 1993 [JP] Japan ................. 5-043266 U

[51] Int. Cl.⁶ ................................................. B60R 21/26
[52] U.S. Cl. ................................. 102/530; 89/1.1
[58] Field of Search ............................ 102/530, 531; 280/806, 734, 741; 89/1.1, 1.4

[56] References Cited

U.S. PATENT DOCUMENTS

| | | | |
|---|---|---|---|
| 3,163,200 | 12/1964 | Broske et al. | 72/412 |
| 3,879,054 | 4/1975 | Lindblad . | |
| 3,986,838 | 10/1976 | Reichert | 23/281 |
| 4,457,204 | 7/1984 | Blomgren | 89/1.14 |
| 4,624,307 | 11/1986 | Kinley | 166/55.3 |
| 5,129,680 | 7/1992 | Mori . | |
| 5,226,667 | 7/1993 | Coultas | 280/734 |
| 5,279,227 | 1/1994 | Nishizawa | 102/274 |

Primary Examiner—Charles T. Jordan
Assistant Examiner—Christopher K. Montgomery
Attorney, Agent, or Firm—Evenson, McKeown, Edwards & Lenahan

[57] ABSTRACT

A gas generating device is constructed of a gas generator, a hammer pin trigger device and a gas guide slot. The gas generator has a detonator. The hammer pin trigger device has a hammer pin arranged movably toward the detonator so that the hammer pin is caused to strike and fire the detonator. The gas guide slot is formed at a joint portion between the gas generator and the hammer pin trigger device for guiding gas, which occurs upon firing the detonator, in a specific direction to an outside of the gas generating device.

13 Claims, 8 Drawing Sheets

GAS GENERATOR

BACKGROUND OF THE INVENTION a) Field of the Invention

This invention relates to a gas generating device for actuating an apparatus such as an air bag system or a webbing pretensioner of a seat belt system, for example, in the event of a collision of an automotive vehicle. More specifically, this invention is concerned with a gas generating device equipped with a hammer pin trigger device which causes a hammer pin to strike a detonator of a gas generator.

b) Description of the Related Art

An air bag system and/or a webbing pretensioner has been used to protect an occupant in the event of a collision of an automotive vehicle. It is necessary to make these devices actuate instantaneously at the time of a collision, so that a gas generating device is employed to cause explosive combustion of a gas-generating chemical reagent such as explosive for the generation of high-temperature gas.

These gas generating devices are available in types, one being electrically fired and the other mechanically fired. Mechanical devices are however finding increasing popularity in recent years for their simpler construction and lower price.

Figure 8:
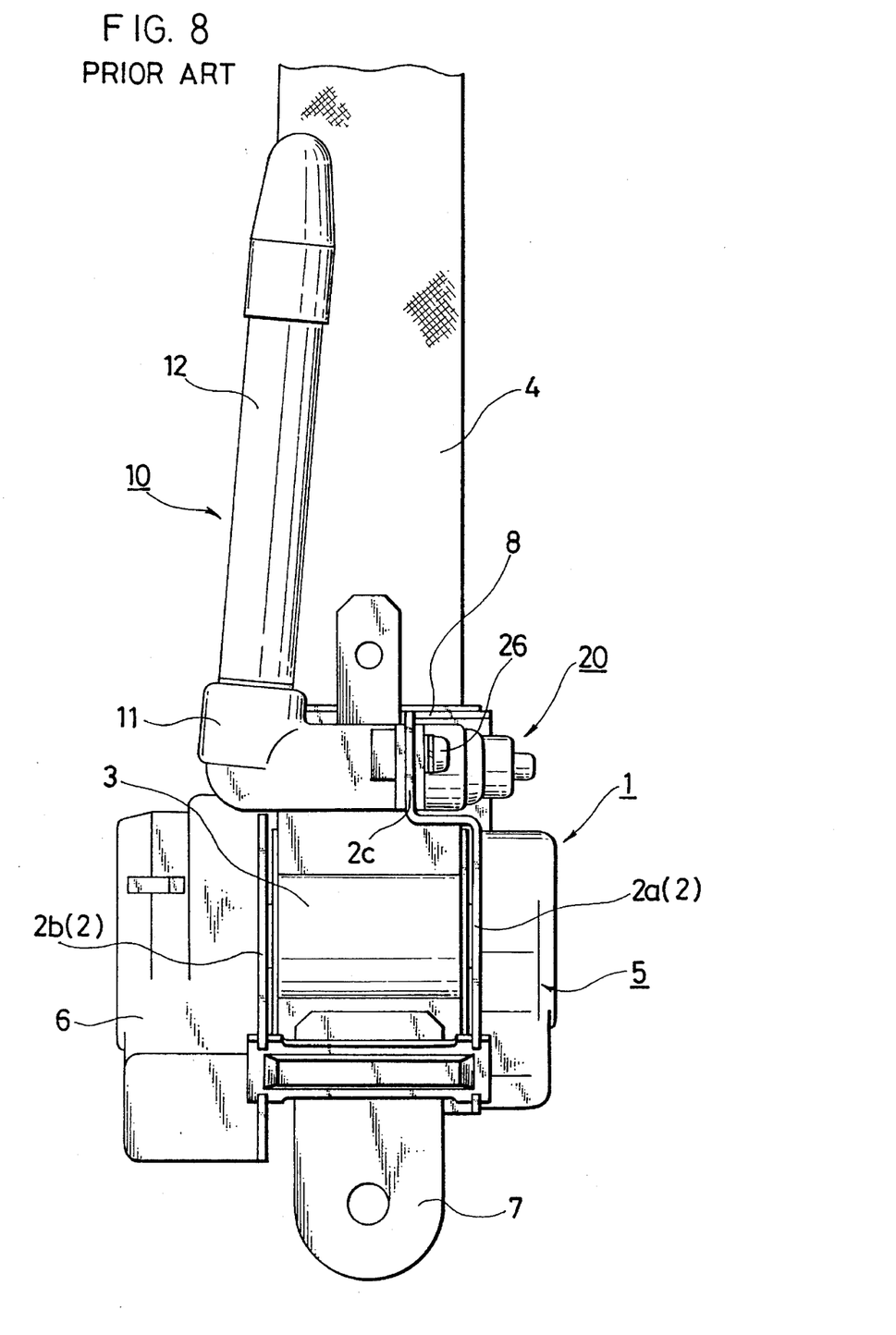
FIG. 8 is a front view of a webbing retractor for an automotive vehicle, which is equipped with a conventional pretensioner.
Figure 9:
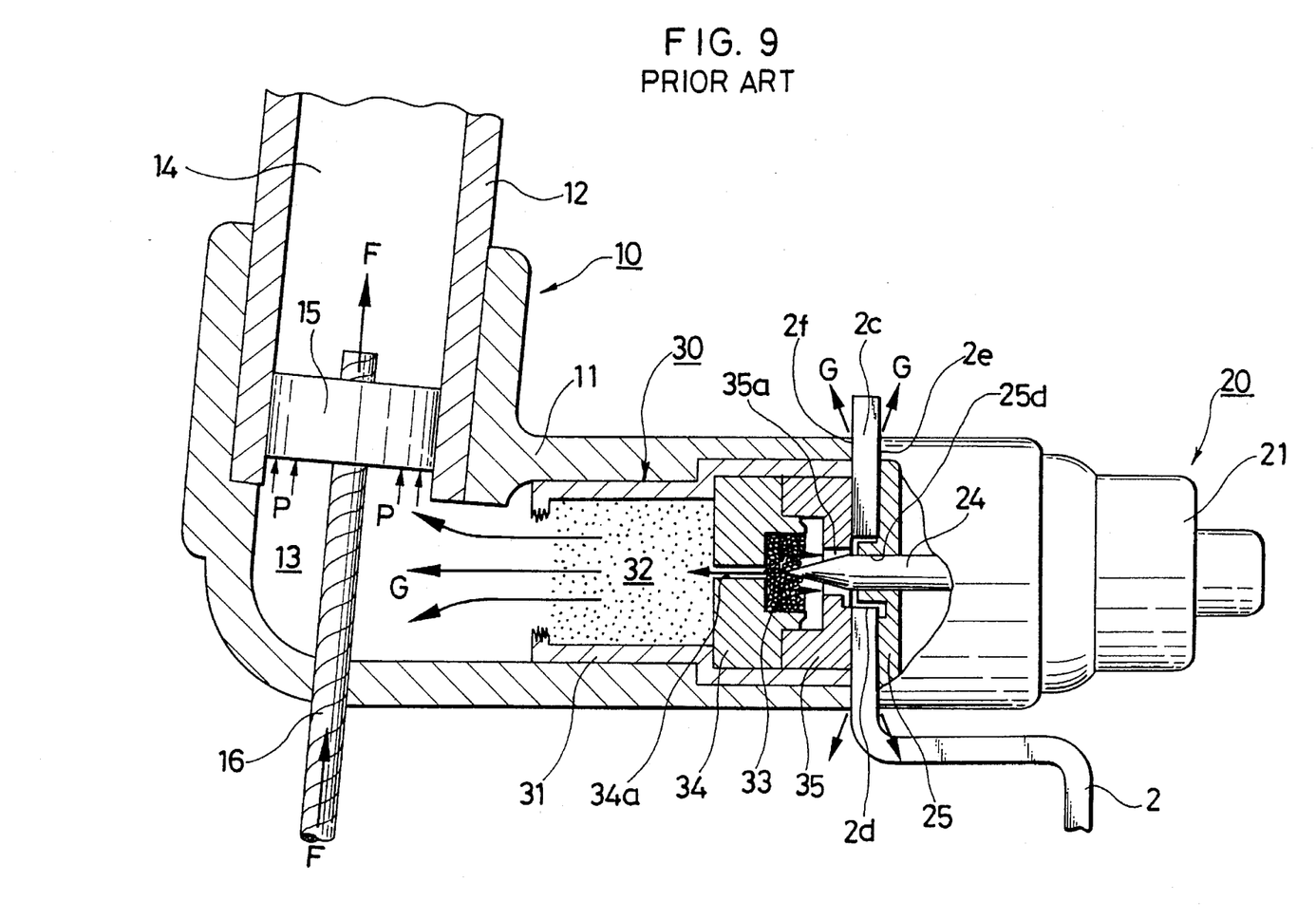
FIG. 9 is a partly cross-sectional view of a gas generating device employed in the conventional pretensioner of FIG. 8, illustrating directions of gas blown out of the gas generating device.
Figure 10:
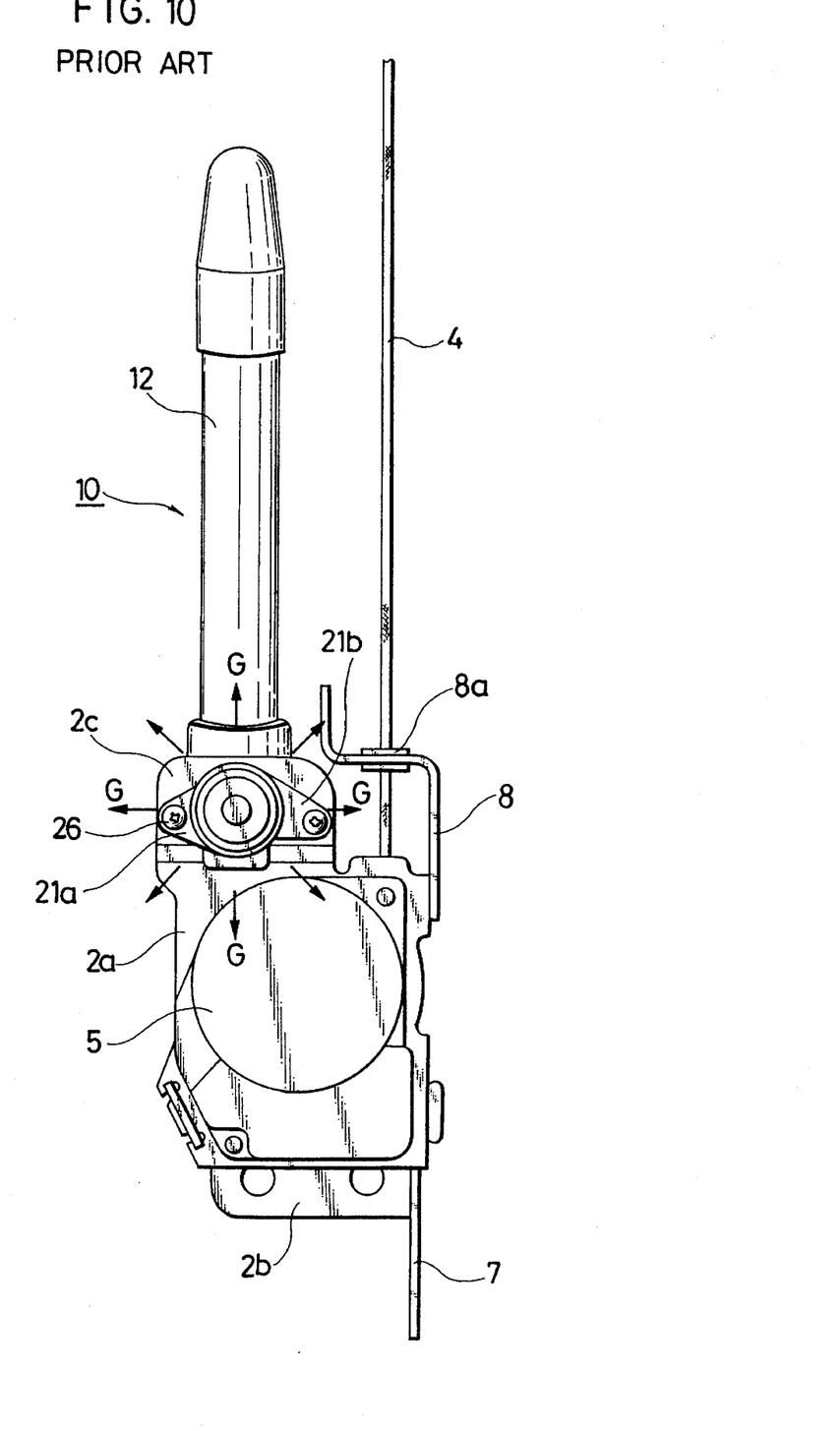
FIG. 10 is a side view of the webbing retractor and the conventional pretensioner, also illustrating directions of gas blown out of the gas generating device.

Referring first to FIGS. 8 through 10, a description will hereinafter be made of a conventional mechanically-triggered gas generating device as applied to a pretensioner of a webbing retractor in an automotive seat belt system.

FIG. 8 is a front view of the webbing retractor equipped with the pretensioner, FIG. 9 is a partly cross-sectional view of the mechanically-triggered gas generating device, and FIG. 10 is a side view of the webbing retractor and shows directions of gas blown out of the mechanically-triggered gas generating device.

The webbing retractor will first be described. As is illustrated in FIGS. 8 and 10, the webbing retractor 1 comprises a frame 2 made of a steel plate, having an inverted square-U-shaped configuration in cross-section and mutually-opposing side walls 2a,2b, a take-up reel 3 rotatably supported at opposite ends thereof on the side walls 2a,2b and adapted to wind in or take up a webbing 4, a winder unit 6 for normally biasing the take-up reel 3 in a webbing-winding direction, and an emergency lock mechanism 5 for locking rotation of the take-up reel 3 to prevent any further release of the webbing 4 upon occurrence of an abrupt deceleration on an automotive vehicle on which the webbing retractor 1 is mounted.

The webbing retractor 1 is mounted on a vehicle body by a tongue-shaped mounting member 7 disposed on a lower side of the frame 2 as viewed in the drawings. The webbing 4, which is made of polyester fibers, can be wound out or released in an upward direction as viewed in the figures while being guided by a webbing guide 8. Attached as an integral unitary member to an upper end portion of the side wall 2a of the frame 2 by way of a horizontal connecting portion is a plate-shaped mounting bracket 2c for the gas generating device. This mounting bracket 2c extends in parallel with the side wall 2a. On opposite sides of the mounting bracket 2c, a hammer pin trigger device 20 and a pretensioner 10 are mounted, respectively, so that the hammer pin trigger device 20 and the pretensioner 10 are arranged opposite each other. The hammer pin trigger device 20 and the pretensioner 10 are threadedly secured on the mounting bracket 2c by bolts 26, whereby the bracket 2c is located between the hammer pin trigger device 20 and the pretensioner 10.

As is illustrated in FIGS. 9 and 10, the hammer pin trigger device 20 has a housing 21 mounted on one side wall 2e of the mounting bracket 2c. This housing 21 has a bottom-closed cylindrical configuration. On an open-end-side outer peripheral wall of the housing 21, mounting flanges 21a,21b are disposed so that they extend perpendicularly to an axis of the housing 21. A hammer pin guide member 25, which will be described subsequently herein, is fitted in the open end of the housing 21, so that the housing 21 is closed.

In the housing 21, a rod-shaped hammer pin 24 is arranged slidably in the direction of the axis. A tip portion of the hammer pin 24 is pointed and is inserted in an aperture 25d of the hammer pin guide member 25. The hammer pin 24 is therefore axially displaceable within the housing 21.

The pretensioner 10 has a cylindrical housing 11 mounted on an opposite side wall 2f of the bracket 2c and a cylinder 12 threadedly fitted in a free end portion of the housing 11. The pretensioner 10 therefore has an L-shaped configuration as viewed in front elevation.

Accommodated in the housing 11 is a gas generator 30 which is disposed in contact with the side wall 2f of the mounting bracket 2c.

This gas generator 30 comprises, as depicted in FIG. 9, a gas-generating chemical reagent 32 enclosed within a bottom-closed cylindrical casing, a detonator holder 34 sealing the gas-generating chemical reagent 32 and holding a detonator 33 on an axis, and a cap 35 defining a hammer pin guide aperture 35a for guiding the tip portion of the hammer pin 24. The detonator 33 is in the form of a detonator which is fired when struck by the pointed tip portion of the hammer pin 24, and is disposed opposite the hammer pin guide aperture 35a. The detonator holder 35 also defines a through-hole 34a so that when the detonator 33 is fired by the hammer pin 24, resulting flame is allowed to blow out into the gas-generating chemical reagent 32 to ignite the gas-generating chemical reagent 32.

Operations of the above-described hammer pin trigger device 20 and the gas generator 30 will next be described.

When an abrupt inertia of at least a predetermined value acts on an unillustrated inertia body arranged in the hammer pin trigger device 20 as a result of a collision or the like of the automotive vehicle, the inertia body is caused to move axially against magnetic repulsion between the inertia body and a cylindrical magnet (not shown). As a result, the hammer pin 24 is caused to move toward the gas generator 30 so that the pointed end portion of the hammer pin 24 strikes and fires the detonator 33. The gas-generating chemical reagent 32 ignited as a result of the firing of the detonator 33 generates a great deal of high-temperature gas G. This high-temperature gas G breaks up the bottom of the casing 31 and blows out into a gas compartment 13 of the pretensioner 10. As a consequence, a piston 15 disposed within the cylinder 12 of the pretensioner 10 is driven by gas pressure P so that the piston 15 is caused to move within the cylinder 12. A wire cable 16 connected to the piston 15 is therefore pulled by pulling force F. Accordingly, the take-up reel 3 on which the wire cable 16 is wound is biased in a direction to wind up the webbing 4, whereby webbing slack is taken up. The occupant's body is therefore firmed restrained on the seat by the slack-free webbing 4, thereby reducing the distance of a sway toward the front of the vehicle body due to an impact of a collision and hence protecting the occupant from injuries which would otherwise occur as a result of impacting a steering wheel or the like.

The above-described gas generator 30 is accommodated within the housing 11 so that the gas generator 30 is located opposite the side wall 2f of the mounting bracket 2c. Further, the cap 35 defines the hammer pin guide aperture 35a through which the hammer pin 24 extends. As a consequence, a part of high-temperature and high-pressure gas G generated by the chemical reagent 32 flows backward and blows out through gaps between the gas generator 30 and housing 11 and the side wall 2f of the mounting bracket 2c. The mounting bracket 2c is also provided with the through-bore 2d through which the hammer pin 24 extends. The high-temperature and high-pressure gas G which has passed through the through-bore 2d blows out through a gap between the impact pin trigger device 20 and the side wall 2e of the mounting bracket 2c. Since the gas so blown out has a considerably high temperature, it may give unfavorable thermal influence to components arranged around the pretensioner 10 and the hammer pin trigger device 20.

This potential problem is not limited to the above-described webbing retractor but also exists in the case of an air bag arranged inside the steering wheel or at another location as long as its gas generating device or the like is mounted in a similar manner.

SUMMARY OF THE INVENTION

With the foregoing in view, the present invention has as a primary object thereof the protection of peripheral components from such thermal influence by controlling the blow-out direction of high-temperature gas leaked out through a joint portion between a gas generator and a hammer pin trigger device.

In one aspect of the present invention, there is thus provided a gas generating device comprising:

a gas generator having a detonator;

a hammer pin trigger device having a hammer pin arranged movably toward said detonator so that said hammer pin is caused to strike and fire said detonator; and gas guide means arranged at a joint portion between said gas generator and said hammer pin trigger device for guiding gas, which occurs upon firing said detonator, in a specific direction to an outside of said gas generating device.

Owing to the provision of the gas guide means arranged at the joint portion between the gas generator and the hammer pin trigger device, the gas guide means can guide therealong high-temperature gas which occurs upon firing the detonator and would otherwise leak out along a joint between the gas generator and the hammer pin trigger device, so that the high-temperature gas is allowed to blow out in the specific direction to avoid thermal influence to peripheral components.

In another aspect of the present invention, there is also provided a gas generating device comprising:

a gas generator having a detonator;

a hammer pin trigger device having a hammer pin arranged movably toward said detonator so that said hammer pin is caused to strike and fire said detonator; and a shielding member arranged outside a joint portion between said gas generator and said hammer pin trigger device for preventing gas, which leaks out along said joint portion upon firing said detonator, from blowing out in a specific direction.

The provision of the shielding member outside the joint portion between the gas generator and the hammer pin trigger device makes it possible to block the gas leaked out along a joint between the gas generator and the hammer pin trigger device, so that the gas is prevented from directly hitting peripheral components.

DETAILED DESCRIPTION OF THE INVENTION AND PREFERRED EMBODIMENTS

The preferred embodiments of the present invention will hereinafter be described in detail with reference to FIGS. 1 through 7 of the accompanying drawings, in which elements of structure similar to the corresponding elements in the conventional construction shown in FIGS. 8 to 10 are identified by like reference numerals and their description will be adequately simplified to avoid superfluous description.

A gas generating device according to the first embodiment of the present invention will be described with reference to FIGS. 1 through 4.

Figure 1:
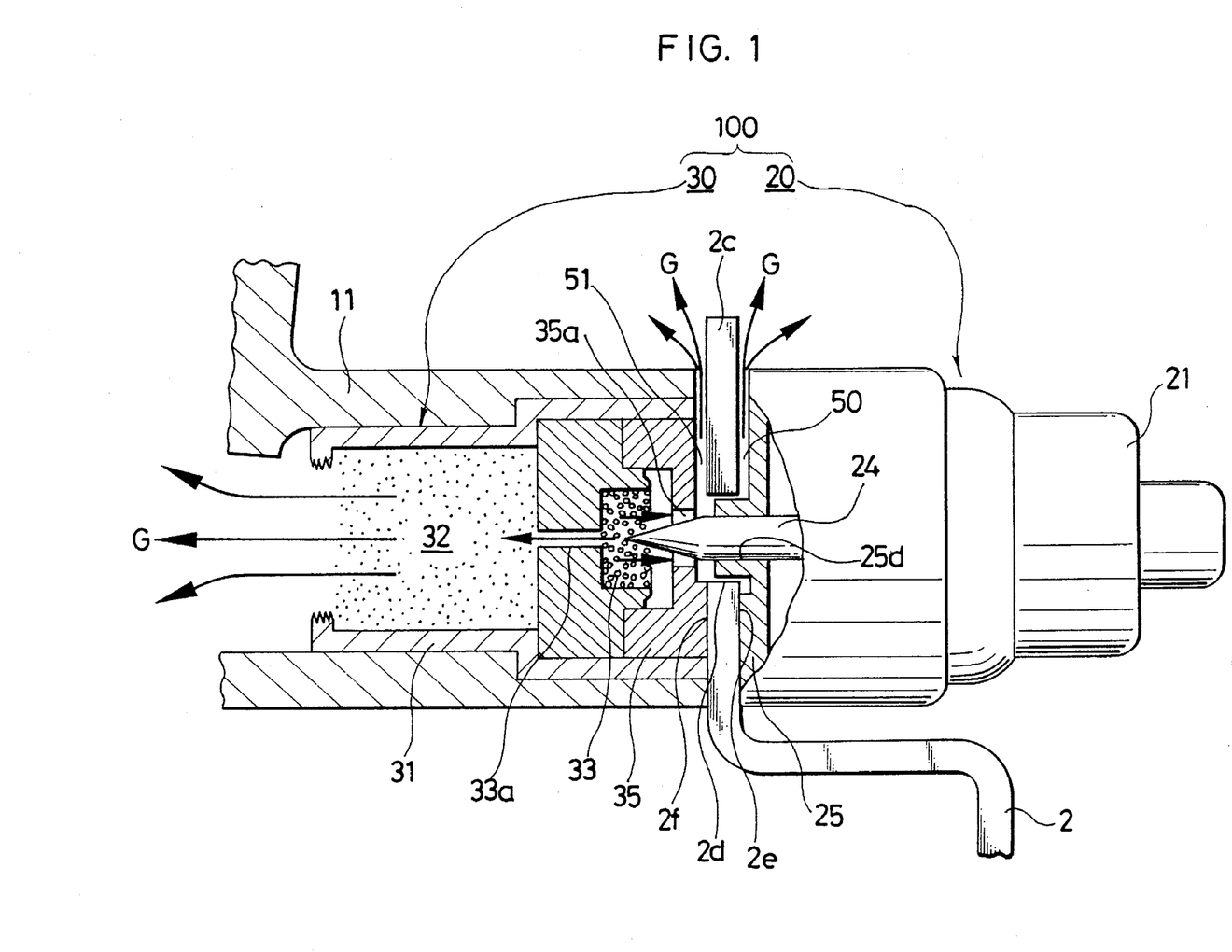
FIG. 1 is a fragmentary cross-sectional view of a gas generating device according to a first embodiment of the present invention.

This gas generating device 100 is basically similar to that illustrated in FIGS. 8 through 10. As is shown in FIG. 1, the gas generator 30 and the hammer pin trigger device 20 are assembled together with the mounting bracket 2c being located therebetween. A joint portion is therefore formed between the gas generator 30 and the hammer pin trigger device 20.

A characteristic construction of this embodiment resides in the provision of gas guide slots 50,51 at the mounting bracket 2c of the frame 2, whereby the through-bore 2d is communicated to an outside of the gas generating device along the mounting bracket 2c.

Figure 2:
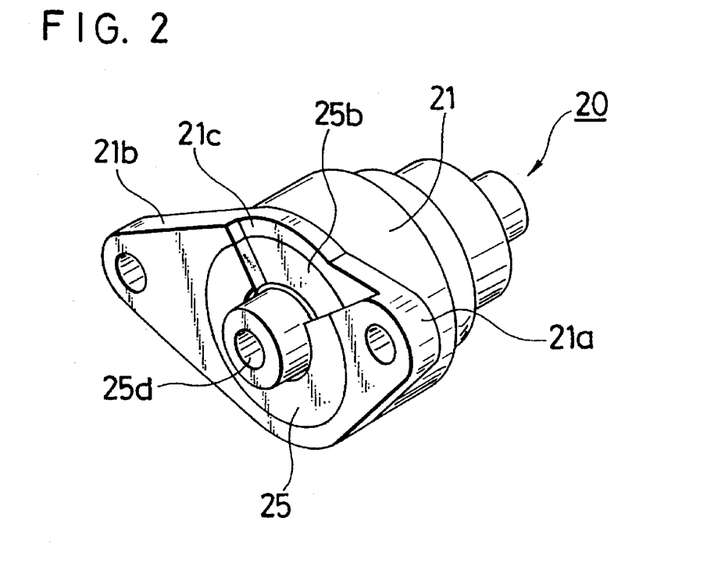
FIG. 2 is a perspective view of a hammer pin trigger device shown in FIG. 1.
Figure 3:
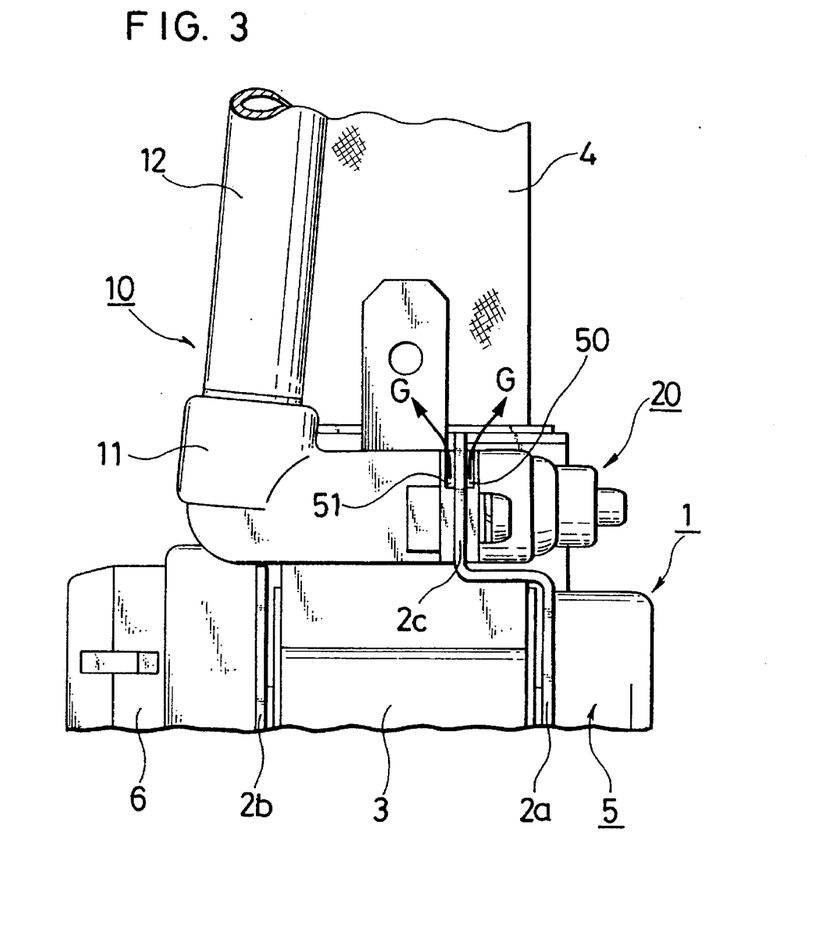
FIG. 3 is a fragmentary front view of the gas generating device of the first embodiment as applied to a webbing retractor for an automotive vehicle.

As is shown in FIG. 2, cut-off portions 21c,25b are provided in a sectorial form in a mounting face of the housing 21 of the hammer pin trigger device 20 and a mounting face of the hammer pin guide member 25 closing the open end of the housing 21, respectively. At these mounting faces, the housing 21 and the hammer pin guide member 25 are mounted on the mounting bracket 2c. The cut-off portions 21c,25b extend from an outer peripheral portion of the hammer pin trigger device 20 to the through-bore 2d formed in the mounting bracket 2c. This particular shape of the cut-off portions 21c,25b is to allow high-temperature gas to spread out in the sectorial form so that the reachable distance of the high-temperature gas is limited. Owing to the provision of these cut-off portions 21c,25b, the gas guide slot 50 adapted to guide the high-temperature gas G is formed when the hammer pin trigger device 20 is mounted on the side wall 2e of the mounting bracket 2c.

Exactly the same cut-off portions are also formed in mounting faces of the gas generator 30 and the housing 11 of the pretensioner 10 which accommodates the gas generator 30. At these mounting faces, the gas generator 30 and the housing 10 are mounted on the mounting bracket 2c. As a consequence, a gas guide slot 51 is formed to guide the high-temperature gas G.

Figure 4:
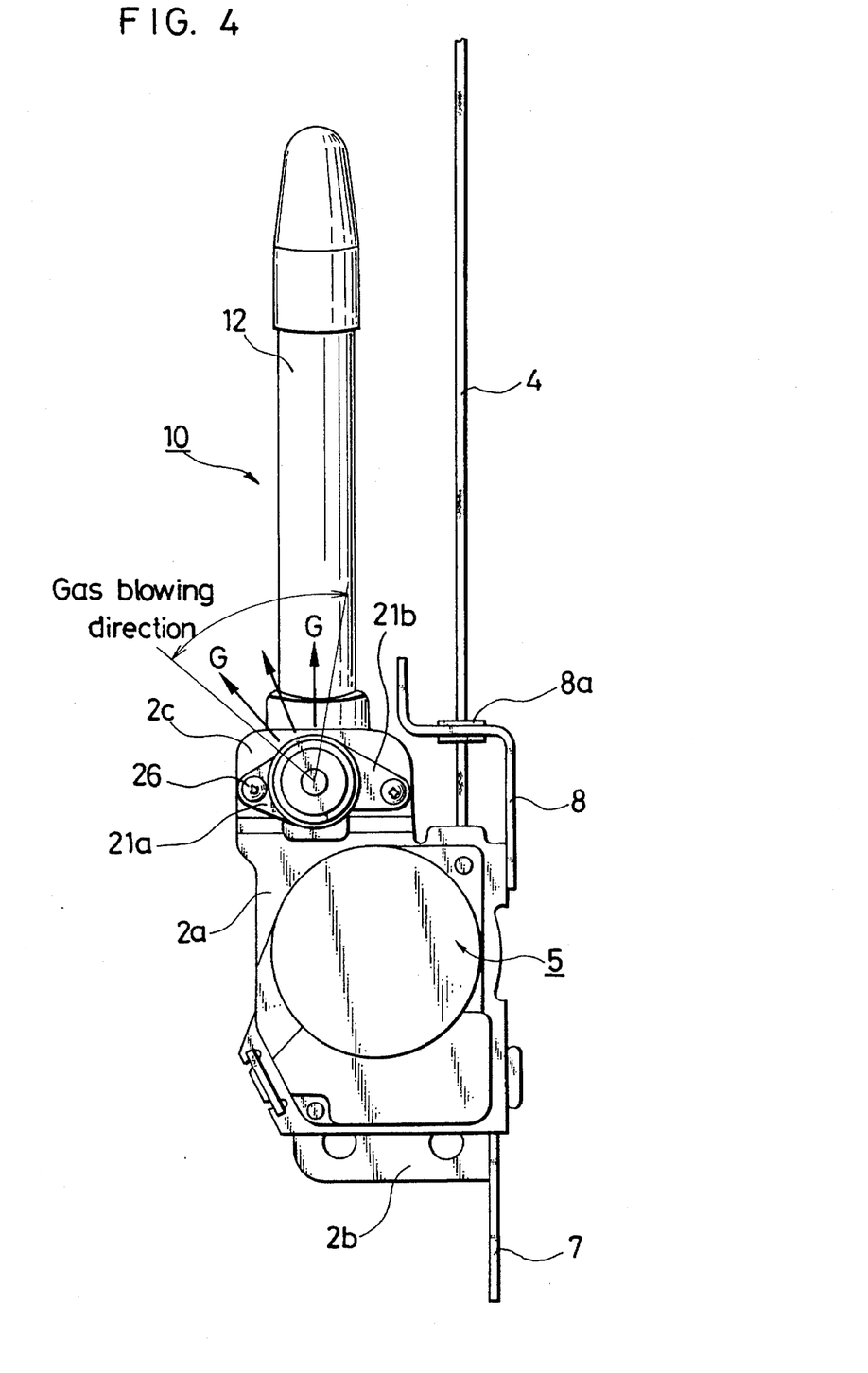
FIG. 4 is a side view of the webbing retractor and the gas generating device of the first embodiment, illustrating directions of gas blown out of the gas generating device through gas guide slots.

As is appreciated from the foregoing description, the gas guide slots 50,51 allow the high-temperature (and also high-pressure) gas G, which has flowed to a side of the hammer pin 24 upon firing the detonator 33 by the hammer pin 24, to blow out of the gas generating device through the gas guide slots 50,51. When the gas generator 30 and the hammer pin trigger device 20 are fixed on the mounting bracket 2c, they cannot be mounted on the side walls 2f,2e without any gap so that gaps communicated with the through-bore 2d are unavoidably formed at locations other than the gas guide slots 50,51. The high-temperature gas G is however allowed to blow out through the gas guide slots 50,51 because it is easier for the high-temperature gas G to flow through the gas guide slots 50,51 than such gaps.

It is accordingly possible to protect peripheral components from adverse thermal effects of the high-temperature gas G by adequately setting the positions of the gas guide slots 50,51, for example, in such a way that the high-temperature gas G blows out in directions where there is a relatively wide open space without components made of a synthetic resin.

In the first embodiment described above, the bracket 2c is arranged at the joint portion between the gas generator 30 and the hammer pin trigger device 20. It is however not necessary to provide the joint portion with such a bracket.

Namely, the gas generator 30 and the hammer pin trigger device 20 may be bolted together either directly or by way of the mounting flanges 21a,21b. It is to be noted that similar flanges are arranged on the side of the gas generator 30. In this modification, the mounting on the bracket 2c is effected at positions other than the joint portion between the gas generator 30 and the hammer pin trigger device 20. In the above modification, gas guide means can be provided, for example, by axially cutting off a part of threads or forming slots in the flange portions.

According to the second embodiment of the present invention, the gas guide slots 50,51 are formed in a different manner. The second embodiment will next be described with reference to FIGS. 5 and 6.

Figure 5:
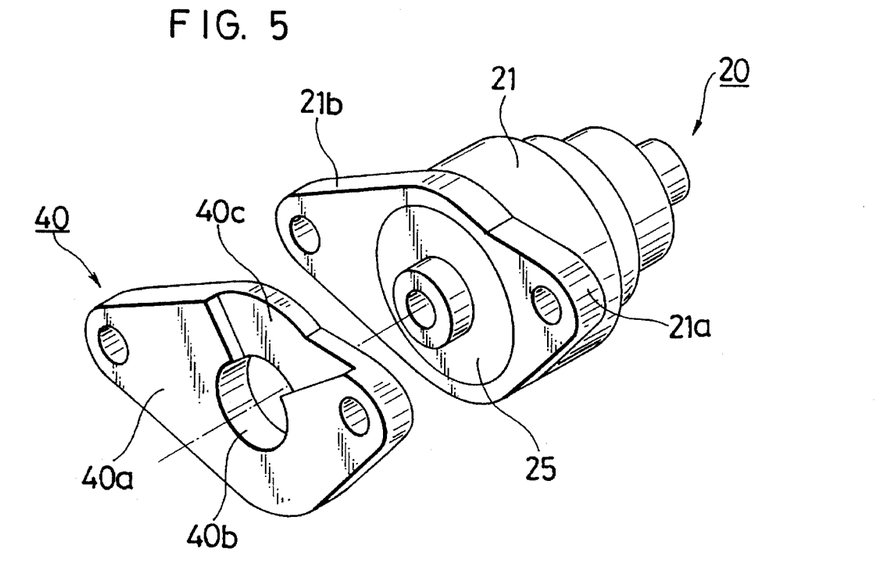
FIG. 5 is a fragmentary perspective view of a gas generating device according to a second embodiment of the present invention.
Figure 6:
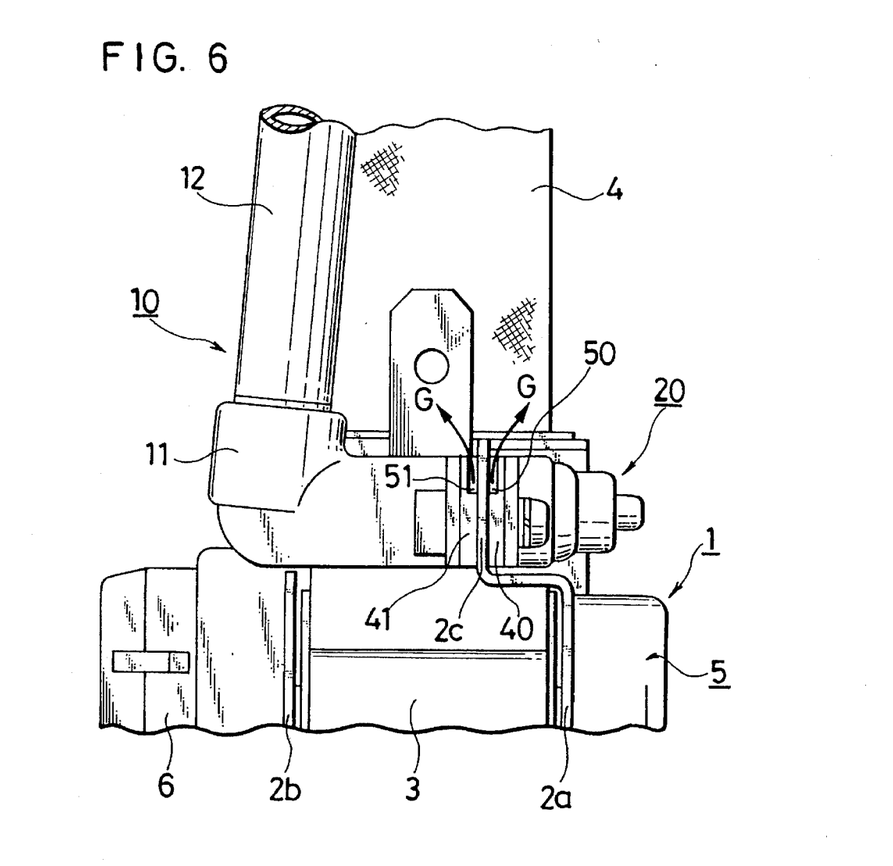
FIG. 6 is a fragmentary front view of a webbing retractor and the gas generating device of the second embodiment, illustrating directions of gas blown out of the gas generating device through gas guide slots.

In the second embodiment depicted in FIGS. 5 and 6, the hammer pin trigger device 20 is mounted on the bracket 2c via a spacer 40 which is preferably made of a metal although a heat-resistant resin or a thermosetting resin can be employed. In the spacer 40, a cutoff portion 40c is formed extending from an outer periphery thereof to a hammer pin insertion hole 40b. Further, an exactly the same cut-off portion 41c is also formed in a spacer 41 interposed between a gas generator (not shown) on a side of the housing 11 of the pretensioner 10, said housing 11 accommodating the gas generator, and the mounting bracket 2c. The spacers 40,41 are mounted so that their cut-off portions 40c,41c are located opposite each other.

The gas guide slots 50,51 are therefore easily formed by mounting these spacers 40,41 on the bracket 2c. These spacers 40,41 also have function as sealing means between the bracket 2c and the hammer pin trigger device 20 and gas generator 30, thereby achieving effective sealing at locations other than the gas guide slots 50,51.

The gas generating device according to the third embodiment of the present invention will next be described with reference to FIG. 7.

Figure 7:
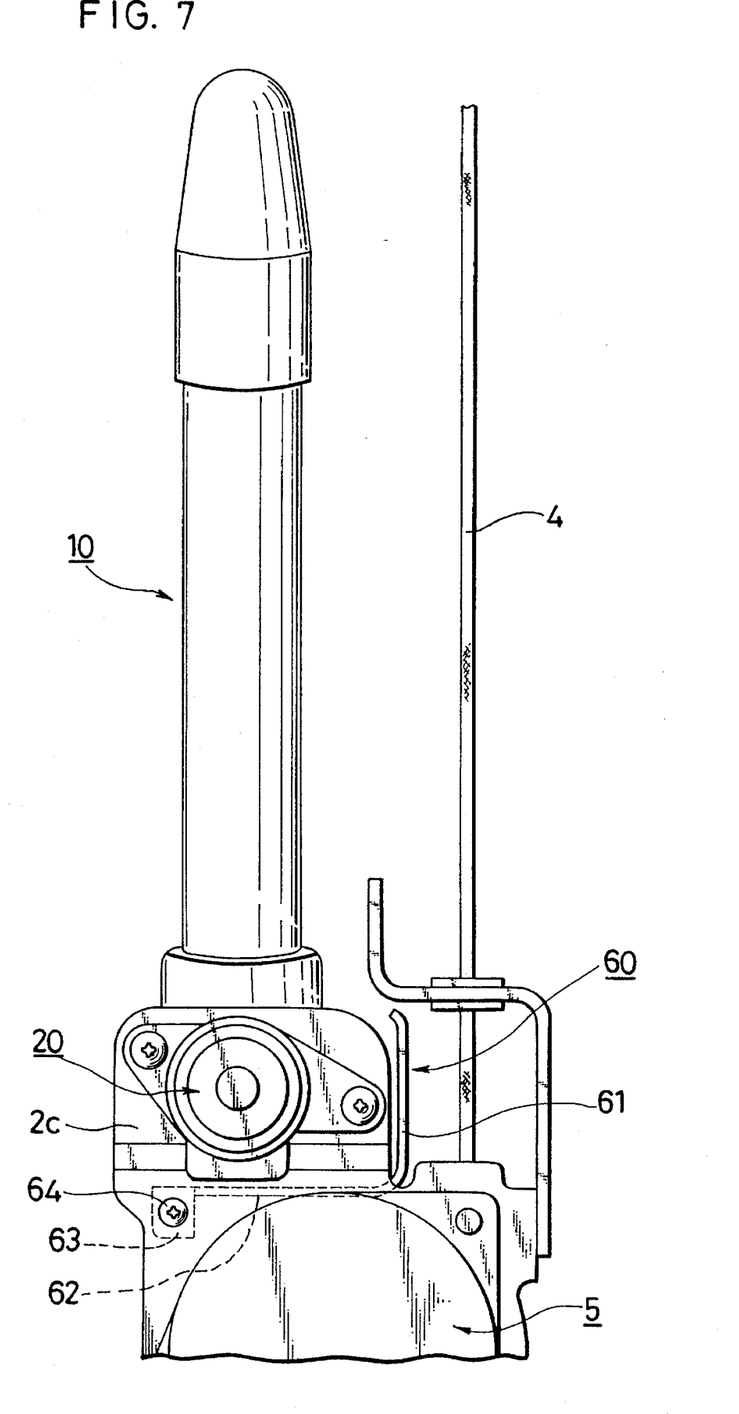
FIG. 7 is a fragmentary side view of a webbing retractor and a gas generating device according to a third embodiment of the present invention, illustrating the manner of arrangement of a gas shielding plate.

As is illustrated in FIG. 7, the gas generating device according to the third embodiment is different from the conventional gas generating device of FIGS. 8 through 10 in that a gas shielding plate 60 is additionally arranged along the gas generating device.

The gas shielding plate 60 has been formed by pressing a metal plate resistant to high temperatures and high pressures, for example, a steel plate into an L-shaped configuration as viewed in cross-section, and comprises a vertical wall 61 extending substantially at a right angle relative to the mounting bracket 2c and substantially in parallel with the webbing 4 and a horizontal wall 62 also extending at substantially right angle relative to the mounting bracket 2c and interposed between the gas generating device and the take-up reel 3. Mounting flanges 63 which are pendant from a distal edge portion of the horizontal wall 62 are threadedly secured on the side walls 2a,2b of the frame 2 by mounting bolts 64, respectively.

High-temperature gas, which has leaked out between a mounting face of the gas generating device and the bracket 2c, is blocked by the shielding plate 60 so that the high-temperature gas does not blow out directly toward the webbing 4 wound out from the take-up reel 3 or the webbing 4 wound on the take-up reel 3. The webbing 4 can therefore be protected from adverse thermal effects. Owing to the provision of the shielding plate 60 outside the joint portion between the gas generator 30 and the hammer pin trigger device 20 so that gas leaked out along the joint portion is blocked from blowing out in a specific direction, the gas leaked out along the joint is blocked by the shielding plate and is prevented from directly hitting peripheral components.

Needless to say, the shape of the shielding plate 60 is not necessarily limited to such an L-shape in cross-section (namely, the vertical wall 61 and the horizontal wall 62 extend at right angle relative to each other) as shown in FIG. 7 and can be modified as needed. To effectively block gas leaked out along the joint, it is however preferred to arrange the shielding plate in such a way that the shielding plate extends in a direction perpendicular to the direction in which the mounting bracket 2c extends.

In each of the above embodiments, the gas generating device according to the present invention was explained in the form as applied to the webbing retractor for the automotive vehicle. As described at the beginning, the present invention is also applicable to a gas generating device of an air bag system or the like.

As has been described above, the gas generating device according to each embodiment of the present invention is provided with the gas guide slots for guiding gas, which leaks out along a mounting face at which the gas generating device is mounted on the mounting bracket, in a particular direction to allow the gas to blow out in that particular direction or is provided with the shielding plate for blocking the gas so leaked. It is therefore possible to prevent high-temperature gas, which has been generated by the detonator, from directing contacting peripheral components, thereby protecting the peripheral components from deleterious effects such as thermal deformation.

What is claimed is:

1. A gas generating device comprising:
   a gas generator having a detonator;
   a hammer pin trigger device having a hammer pin arranged movably towards said detonator so that said hammerpin is caused to strike and fire said detonator; and
   gas guide means arranged at a joint portion between said gas generator and said hammer pin trigger device for guiding gas, which occurs upon firing said detonator, in a specific direction to an outside of said gas generating device, wherein said gas guide means comprises a gas guide slot formed in said gas generator.

2. A gas generating device comprising:
   a gas generator having a detonator;
   a hammer pin trigger device having a hammer pin arranged movably towards said detonator so that said hammer pin is caused to strike and fire said detonator; and
   gas guide means arranged at a joint portion between said gas generator and said hammer pin trigger device for guiding gas, which occurs upon firing said detonator, in a specific direction to an outside of said gas generating device, wherein said gas guide means comprises a gas guide slot formed in said hammer pin trigger device.

3. A gas generating device comprising:
   a gas generator having a detonator;
   a hammer pin trigger device having a hammer pin arranged movably towards said detonator so that said hammer pin is caused to strike and fire said detonator;
   gas guide means arranged at a joint portion between said gas generator and said hammer pin trigger device for guiding gas, which occurs upon firing said detonator, in a specific direction to an outside of said gas generating device; and
   a bracket disposed between said gas generator and said hammer pin trigger device and defining therein a through-bore through which said hammer pin extends, and said gas guide means is provided communicating from said through-bore to said outside.

4. A gas generating device according to claim 3, wherein said hammer pin trigger device comprises a bottom-closed cylindrical housing and a hammer pin guide member disposed closing an open end of said housing, and said guide member centrally defines an aperture through which said hammer pin is allowed to pass.

5. A gas generating device according to claim 4, wherein cut-off portions are defined in walls of said housing and guide member, respectively, said walls being located opposite said bracket, and said cut-off portions form said gas guide means.

6. A gas generating device according to claim 5, wherein said cut-off portions are sectorial in shape.

7. A gas generating device according to claim 3, wherein said gas generator comprises a bottom-closed cylindrical casing and a cap disposed in said casing on a side of said bracket, and said cap defines a through-hole for guiding a tip portion of said hammer pin.

8. A gas generating device according to claim 7, wherein cut-off portions are defined in walls of said casing and cap, respectively, said walls being located opposite said bracket, and said cut-off portions form said gas guide means.

9. A gas generating device according to claim 3, further comprising a housing mounted on said bracket and accommodating said gas generator therein, wherein said gas guide means is formed between said housing and said bracket.

10. A gas generating device according to claim 3, wherein at least one of said hammer pin trigger device and said gas generator has a spacer on a wall located opposite said bracket and said gas guide means is formed between said spacer and said bracket.

11. A gas generating device comprising:
    a bracket defining a through-bore therein;
    a hammer pin trigger device mounted on one side of said bracket, said hammer pin trigger device having a hammer pin movable in a direction to pass through said through-bore;
    a gas generator mounted on an opposite side of said bracket and having a detonator which is fired when struck by said hammer pin; and
    a gas guide slot formed between said bracket and at least one of said hammer pin trigger device and said gas generator and communicating from said through-bore to an outside of said gas generating device for guiding gas, which occurs upon firing said detonator, in a specific direction to said outside.

12. A gas generating device comprising:
    gas generator having a detonator;
    a hammer pin trigger device having a hammer pin arrange movably towards said detonator so that said hammer pin is caused to strike and fire said detonator; and
    a shielding member arranged outside a joint portion between said gas generator and said hammer pin trigger device for preventing gas, which leaks out along said joint portion upon firing said detonator, from blowing out in a specific direction, wherein said joint portion has a bracket disposed between said gas generator and said hammer pin trigger device and carrying said gas generator and said hammer pin trigger device mounted thereon, and said shielding member has a gas shielding plate extending substantially at a right angle relative to said bracket.

13. A gas generating device according to claim 12, wherein said gas shielding plate comprises a first wall and a second wall extending at a right angle relative to said first wall.

* * * * *